(12) United States Patent
    Varadhan

(10) Patent No.: US 8,686,995 B2
(45) Date of Patent: Apr. 1, 2014

(54) PATH PLANNING FOR STREET LEVEL NAVIGATION IN A THREE-DIMENSIONAL ENVIRONMENT, AND APPLICATIONS THEREOF

(75) Inventor: Gokul Varadhan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/302,596

(22) Filed: Nov. 22, 2011

(65) Prior Publication Data

US 2012/0127170 A1        May 24, 2012

Related U.S. Application Data

(60) Provisional application No. 61/416,920, filed on Nov. 24, 2010.

(51) Int. Cl.
    *G06T 15/00* (2011.01)
(52) U.S. Cl.
    USPC ............... 345/419; 345/427; 382/10; 348/39
(58) Field of Classification Search
    USPC .................... 345/419, 427; 382/10; 348/39
    See application file for complete search history.

(56) References Cited

U.S. PATENT DOCUMENTS

| 7,256,779 B2 * | 8/2007 | Donnelly ..................... 345/421 |
| 7,711,478 B2 * | 5/2010 | Gluck .......................... 701/436 |
| 7,746,343 B1 * | 6/2010 | Charaniya et al. ........... 345/428 |
| 8,238,693 B2 * | 8/2012 | Nurminen et al. ............ 382/286 |
| 2008/0291217 A1 | 11/2008 | Vincent et al. |
| 2009/0259976 A1 * | 10/2009 | Varadhan et al. ............. 715/850 |
| 2009/0319166 A1 * | 12/2009 | Khosravy et al. ............ 701/200 |
| 2009/0319348 A1 * | 12/2009 | Khosravy et al. ........... 705/14.1 |
| 2010/0118116 A1 * | 5/2010 | Tomasz et al. .................. 348/36 |
| 2010/0305847 A1 * | 12/2010 | Gluck .......................... 701/201 |
| 2010/0318291 A1 * | 12/2010 | Gluck .......................... 701/208 |

OTHER PUBLICATIONS

Kulju et al. "Route Guidance Using a 3D City Model on a Mobile Device". Published 2002.*
Trindade et al. "Improving 3D Navigation in Multiscale Environments Using Cubemap-based Techniques". ACM, Mar. 2011.*
McCrae et al. "Multiscale 3D Navigation". ACM, 2009.*
Kopf "Street Slide: Browsing Street Level Imagery". Published 2007.*

(Continued)

*Primary Examiner* — Kimbinh T Nguyen
(74) *Attorney, Agent, or Firm* — Dority & Manning, P.A.

(57) ABSTRACT

Embodiments relate to navigating along a street network in a geographic information system. In an embodiment, a computer-implemented method navigates a virtual camera in a three-dimensional environment at street-level. The virtual camera defines a perspective to display the three-dimensional environment. In the method, a target location is determined in the three-dimensional environment. A path along a representation of a street in the three-dimensional environment is determined. The path is from a first position corresponding to an initial location of the virtual camera to a second position corresponding to the target location. A virtual camera is moved in the three-dimensional environment toward the target location along the path. Finally, the virtual camera is oriented to face the target location as the virtual camera moves along the path.

16 Claims, 5 Drawing Sheets

(56) References Cited

OTHER PUBLICATIONS

European Patent Office, PCT—Notification of Transmittal of the International Search Report and the Written Opinion of the International Searching Authority, or the Declaration and Written Opinion of the International Searching Authority, mailed May 8, 2012, International Appln. No. PCT/US2011,061913, Filed Nov. 22, 2011.

Geraerts, Roland, Camera Planning in Virtual Environment Using the Corridor Map Method, Nov. 21, 2009, Motion in Games, Springer Berlin Heidelberg, Berlin, Heidelberg, pp. 194-206.

Li et al., GameOD: An Internet Based Game-On-Demand Framework, ACM Symposium on Virtual Reality Software and Technology, ACM, US, Nov. 10, 2004, pp. 129-136.

\* cited by examiner

US 8,686,995 B2

PATH PLANNING FOR STREET LEVEL NAVIGATION IN A THREE-DIMENSIONAL ENVIRONMENT, AND APPLICATIONS THEREOF

This application is a nonprovisional application claiming priority to U.S. Patent Application No. 61/416,920 filed Nov. 24, 2010, incorporated herein in its entirety.

BACKGROUND

1. Field of the Invention

The present field relates to navigating in a geographic information system.

2. Related Art

A geographic information system (GIS) is a system for archiving, retrieving, displaying or manipulating data indexed according to the data elements' geographic coordinates. The data element may be a variety of data types such as, for example, imagery, maps, models of buildings and terrain and other geographic features. A geographic information system may display a three-dimensional environment to a user from a perspective of a virtual camera. The perspective of a virtual camera may be defined by a position and orientation. By changing the position and orientation of the virtual camera, the user can sightsee within the three-dimensional environment.

BRIEF SUMMARY

Embodiments relate to navigating along a street network in a geographic information system. In an embodiment, a computer-implemented method navigates a virtual camera in a three-dimensional environment at street-level. The virtual camera defines a perspective to display the three-dimensional environment. In the method, a target location is determined in the three-dimensional environment. A path along a representation of a street in the three-dimensional environment is determined. The path is from a first position corresponding to an initial location of the virtual camera to a second position corresponding to the target location. A virtual camera is moved in the three-dimensional environment toward the target location along the path. Finally, the virtual camera is oriented to face the target location as the virtual camera moves along the path.

In another embodiment, a system navigates a virtual camera in a three-dimensional environment at street-level. The virtual camera defines a perspective to display the three-dimensional environment. The system includes a target module that determines a target location in the three-dimensional environment. A path planner module determines a path along a representation of a street in the three-dimensional environment. The path is from a first position corresponding to an initial location of the virtual camera to a second position corresponding to the target location. Finally, a path motion module moves a virtual camera in the three-dimensional environment toward the target location along the path and orients the virtual camera to face the target location as the virtual camera moves along the path.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments relate to navigating a virtual camera through a three-dimensional environment of a geographical information system, such as Google Earth, at street-level. In an example, the virtual camera navigates along a road network toward a target. As the virtual camera navigates along the road network, the camera may be oriented to face the target. By moving the virtual camera along the road network, the virtual camera may avoid colliding with potential obstacles in the three-dimensional environment, such as buildings.

Figure 1A:
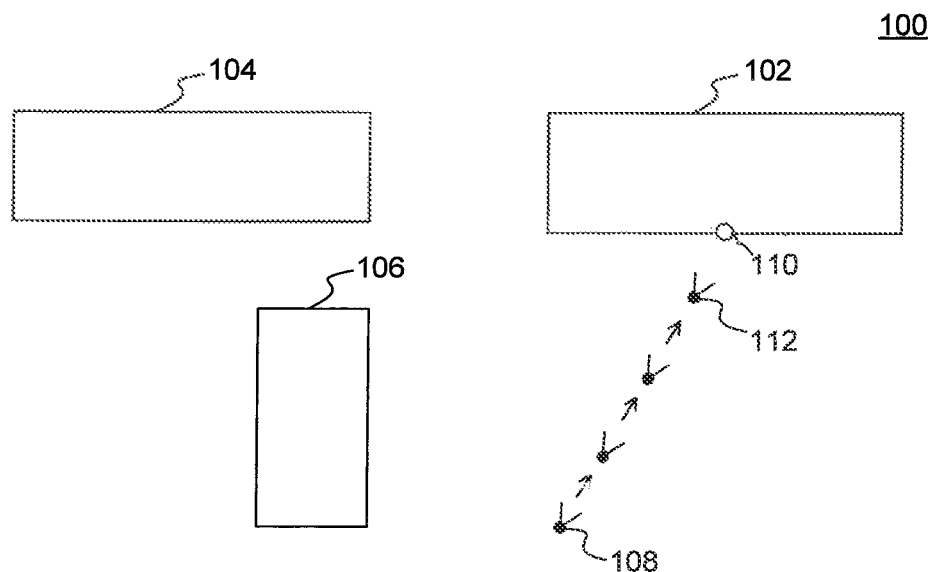
FIG. 1A is a diagram illustrating navigating a virtual camera toward a target.

FIG. 1A shows a diagram 100 illustrating navigating a virtual camera moving toward a target 110 on a building 102. In addition to building 102, diagram 100 also shows buildings 104 and 106.

In diagram 100, the virtual camera starts at a position 108. The virtual camera moves directly toward target 110. In an example, virtual camera 108 may follow the shortest trajectory to target 110, e.g., a straight line. As the virtual camera 108 moves toward the target, the view of the three-dimensional environment displayed to a user may change accordingly. For example, building 102 may appear larger in the viewport as the virtual camera approaches. When the virtual camera reaches position 112, it may be close enough to target 110 to enable a user to view and examine target 110 on building. At that point, the virtual camera comes to a rest, and the target 110 is displayed in a viewport to a user.

While the approach in diagram 100 may have benefits when the virtual camera is traveling through empty space, at street level obstacles may hinder movement of the virtual camera. For example, if the three-dimensional environment included buildings between initial position 108 of virtual camera and final position 112, the virtual camera may collide with the buildings. These collisions may be awkward for a user. At least in part to avoid collisions, embodiments navigate the virtual camera along a street network as illustrated in FIG. 1B.

Figure 1B:
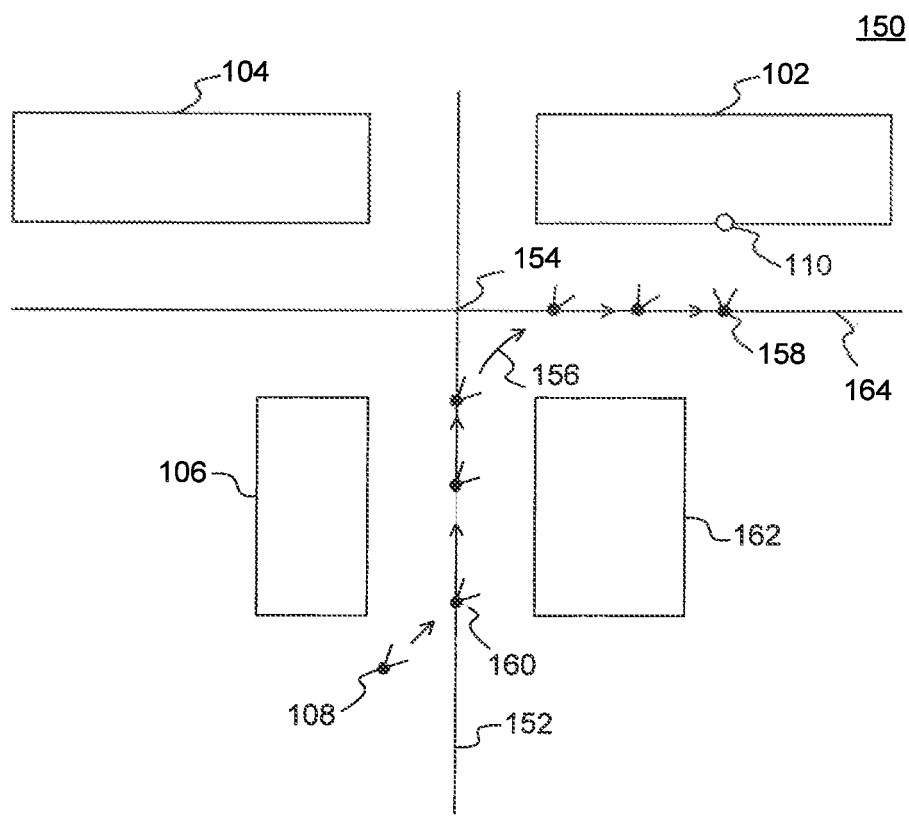
FIG. 1B is a diagram illustrating navigating a virtual camera along a street network toward a target, according to an embodiment.

FIG. 1B shows a diagram 150 illustrating navigating a virtual camera along a street network toward a target, according to an embodiment. Streets are merely illustrative and other real-world pathways may be used (e.g., walking and bicycle pathways). Similar to diagram 100, diagram 150 shows initial location 108 of the virtual camera. Diagram 150 shows buildings 104, 106 and 102, and on building 102 is target 110.

In contrast to diagram 100, diagram 150 includes a building 162 obstructing the path from position 108 to a position for viewing target 110. To avoid colliding with building 162, the virtual camera moves along a street network. Diagram 150 shows a street network including streets 152 and 164. Streets 152 and 164 intersect at an intersection 154.

To travel along the street network, the virtual camera may follow the shortest path on the street network shown in diagram 150. For example, the virtual camera may start at an initial position 108. Initial position 108 may not be on the street network. However, the virtual camera may travel to the street network to position 160. Once at position 160, the virtual camera may travel along street 152 toward target 110. As the virtual camera moves toward target 110, the virtual camera may remain oriented to face target 110. When the virtual camera approaches intersection 154, the virtual camera may round a turn 156 to transition onto street 164. The virtual camera may continue on street 164 to a final position 158. At final position 158, the virtual camera may be positioned sufficiently close to target 110 to enable a user to examine target 110. In this way, embodiments utilize a street network to navigate a virtual camera to a target in a three-dimensional environment. This and other embodiments are described in greater detail below.

As will be described below, target 110 may be determined by a user selection on a viewport as in FIG. 3. In that embodiment, a line of sight between the initial position of the virtual camera and the target may be necessary. However, in other embodiments, a line of sight between target 110 and the initial position of the virtual camera may not be necessary.

Figure 2:
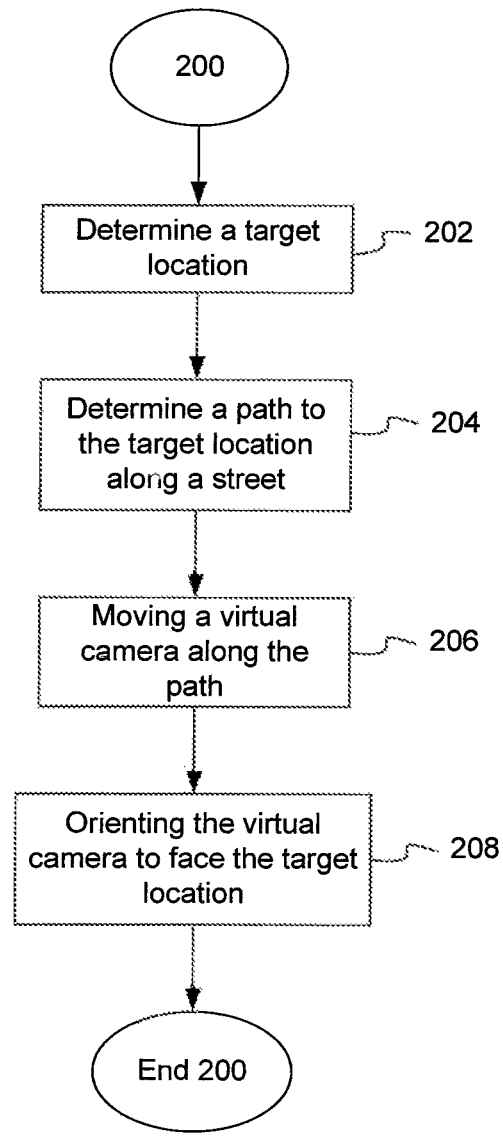
FIG. 2 is a flowchart illustrating a method for navigating a virtual camera along a street network toward the target, according to an embodiment.

FIG. 2 is a flowchart illustrating a method 200 for navigating a virtual camera along a street network toward the target, according to an embodiment. For clarity, method 200 is described with respect to FIG. 3 and FIGS. 4A-B. However, method 200 is not limited thereto.

Method 200 begins by determining a target at a step 202. The target may be any point or region in the three-dimensional environment. In an example, the three-dimensional environment may include a plurality of models and the target may be a model or a position on a model. A user may specify a target location. For example, a user may enter in an address or coordinates to specify a location in the three dimensional environment. In an embodiment, the location may be at ground- or street-level. One example of determining a target location is illustrated in FIG. 3.

Figure 3:
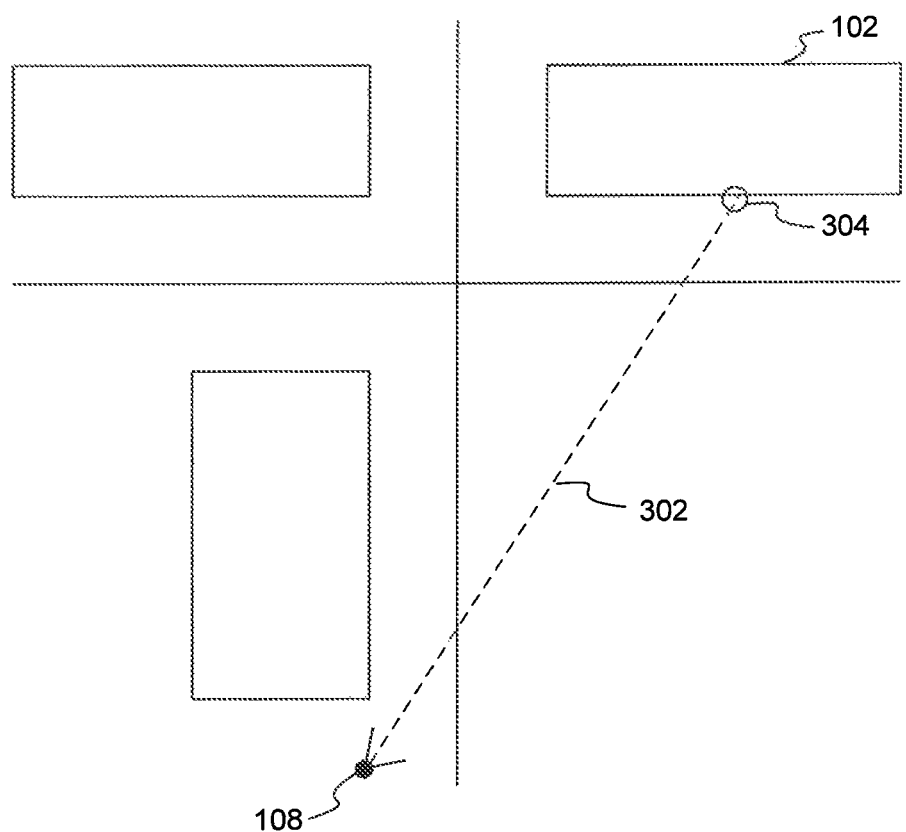
FIG. 3 is a diagram illustrating selecting a target in a three-dimensional environment from a viewport, according to an embodiment.

FIG. 3 is a diagram 300 illustrating selecting a target in a three-dimensional environment from a viewport, according to an embodiment.

In an example, a user may select a position in a viewport displaying the three-dimensional environment from the perspective of the virtual camera. The GIS may receive position data representing a position on a viewport selected by a user. The GIS may determine a point in the three-dimensional environment based on the position selected by the user and a focal length of the virtual camera. In an example, the distance between the determined point may and the focal point may correspond to the focal length of the virtual camera.

Once the point in the three-dimensional environment is determined based on the position selected by the user, the GIS may extend a ray based on the position selected by the user. In an example, the GIS may extend the ray from a focal point or entrance pupil of the virtual camera. The ray may extend from the focal point or entrance pupil through the determined point. Diagram 300 shows an example ray 302.

With a ray, such as ray 302 extended, the target location may be determined based on the ray. In an embodiment, the three-dimensional model may include a plurality of models, such as building models. In that embodiment, the target location may be determined to be the intersection of the ray with a model in the three-dimensional environment. In diagram 300, the intersection of ray 302 and building 102 is shown as target location 304. In this way, a target location may be determined based on a user selection in a viewport.

Returning to method 200, once the target location is determined at step 202, a path along a street network to the target location is determined at step 204. To determine a path, a GIS may determine driving directions from the present location of the virtual camera to the target. The GIS may, for example, utilize web services to determine driving directions. The path determined at step 204 may be the shortest path on the street network from the present location of the virtual camera to the target location. In another example, the path determined at step 204 may be the path on the street network from the present location of the virtual camera to the target location with the fewest number of turns. In a further example, the path may be determined using a variety of criteria including distance and number of turns.

The path may guide the virtual camera close to the target location. For example, the path may guide the virtual camera to the position in the street network closest to the target location. Alternatively and additionally, the path may be determined such that it does not exceed a maximum distance. Capping the path at a maximum distance may increase stability of the virtual camera. Further, the maximum distance may reduce unintended camera movements when the target location is incorrectly specified.

In an embodiment, the street network in the three-dimensional model may be associated with a discontinuous series of points. In an example, a panoramic photograph may be located at each point in the series of points. When the virtual camera is located at the point, the GIS may display the photographic image data from the perspective of the virtual camera. This embodiment is illustrated in FIGS. 4A-B.

Figure 4A:
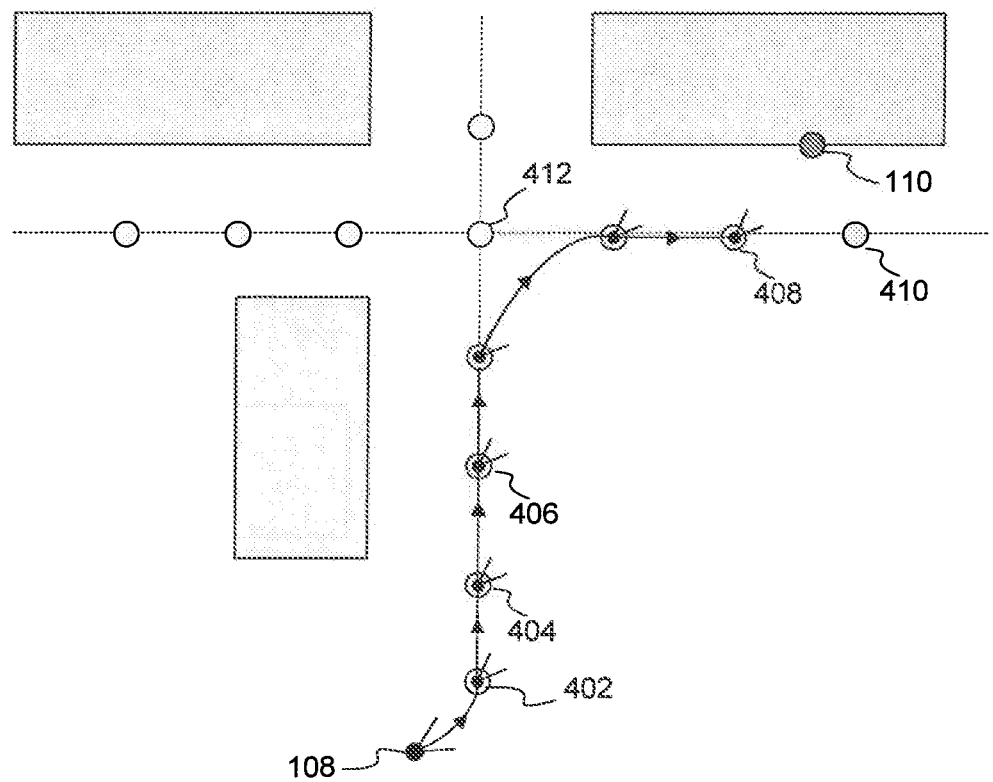
FIGS. 4A-B are diagrams illustrating further features for planning a path along a street network.
Figure 4B:
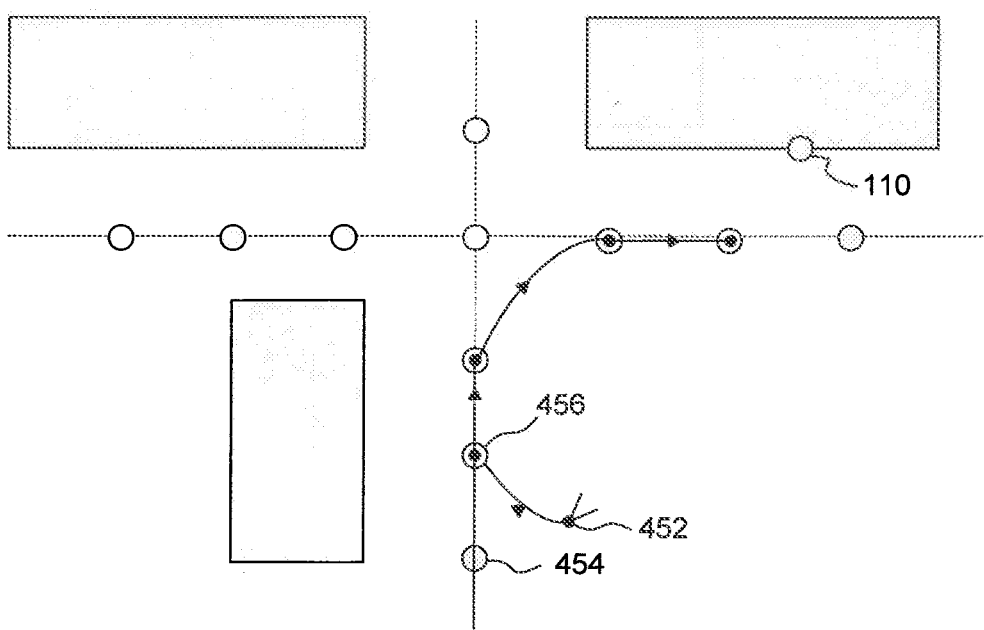

FIGS. 4A-B show diagrams illustrating further features for planning a path along a street network including a series of panoramas. For example, FIG. 4A shows a diagram 400 that illustrates determining a path to avoiding overshooting the target, and FIG. 4B shows a diagram 450 that illustrates determining a path to avoid moving away from the target.

Diagram 450 shows a virtual camera at initial position 108. Diagram 400 further shows a path for the virtual camera that guides it along a street network to position 408. The street network shows as a corresponding series of panoramas including panorama 402, 404, 406, 408, 410, and 412. As indicated above, each panorama in the series may be geocoded to a location where a panoramic photograph was taken.

The path begins at the virtual camera's initial position 108. Initial position 108 is not on the street network. Thus, to travel along the street network, the virtual camera must first move to a location on the street network. The location on the street network may be a panorama in the series of panoramas that is closest to initial position 108. In diagram 400, the closest panorama to initial position 108 is panorama 402. Thus, the path may specify a trajectory for the virtual camera to move to the location of panorama 402.

Once the path guides the virtual camera to the location of panorama 402 on the street network, the path defines the trajectory for the virtual camera to move along the street network toward target 110. The path may specify a route along the street network including panoramas 402, 404, and 406.

While the path may include panoramas 402, 404, and 406, the path may exclude panorama 412. Panorama 412 is located at an intersection of the street network. If the virtual camera traveled to the intersection and made a 90 degree turn, the user may experience an abrupt angle. At least in part to deal with the abrupt turn, the virtual camera may round the turn, bypassing panorama 412. To specify the rounded turn, the path may include an interpolated spline.

After specifying the turn, the path specifies a final position of the virtual camera to view target 110. In one embodiment, the final position of the virtual camera is the closest panorama to target 110. While this approach may have advantages, it also may cause the virtual camera to overshoot the target. For example, in diagram 400, the panorama closest to target 110 is panorama 410. However, if the virtual camera traveled all the way to panorama 410, the virtual camera would move past target 110. This may present an undesirable user experience. To deal with this, the final panorama in the path may be a position of the panorama closest to the target location of the virtual camera that does not specify that the virtual camera move past the target location.

As mentioned above, the initial position of the virtual camera may not be on the street network. Thus, the path may need to define a trajectory for the virtual camera to move to a street. In one embodiment, the trajectory may be a route to the closest panorama. However, moving to the closest panorama may require moving away from the target. A trajectory from an initial position to a street that does not involve moving away from the target is illustrated in FIG. 4B FIG. 4B shows a diagram 450 that illustrates determining a trajectory from an initial position to a street without moving away from the target. Diagram 450 shows an initial position 452 of the virtual camera and panoramas 454 and 456. Panorama 454 is closer to initial position 452 than panorama 456. However, panorama 454 is also further from target 110 than initial position 452. In contrast, panorama 456 is closer to target 110 than initial position 452. Because panorama 456 is the panorama closest to initial position 452 that does not require movement away from target 110, the path specifies a trajectory to panorama 456.

Referring back to FIG. 2, once the path is determined at step 204, the virtual camera is moved along the path at step 206. In the embodiment where a path is specified by a series of points or panoramas, the virtual camera may move to each point or panorama in the path in the order specified by the path. In the embodiment where the virtual camera moves through a series of panoramas, the panoramas may be texture mapped to a three dimensional model.

As the virtual camera moves along the determined path, the virtual camera may be oriented to face the target at step 208. In one embodiment, the virtual camera may be oriented such that the target remains at the same position in the viewport as the virtual camera moves through the three-dimensional environment. In another embodiment, the target may not stay in precisely the same place in the viewport. However, the target may remain within a region of the viewport. For example, the target may remain within a rectangle representing the 80% center region of the viewport.

Figure 5:
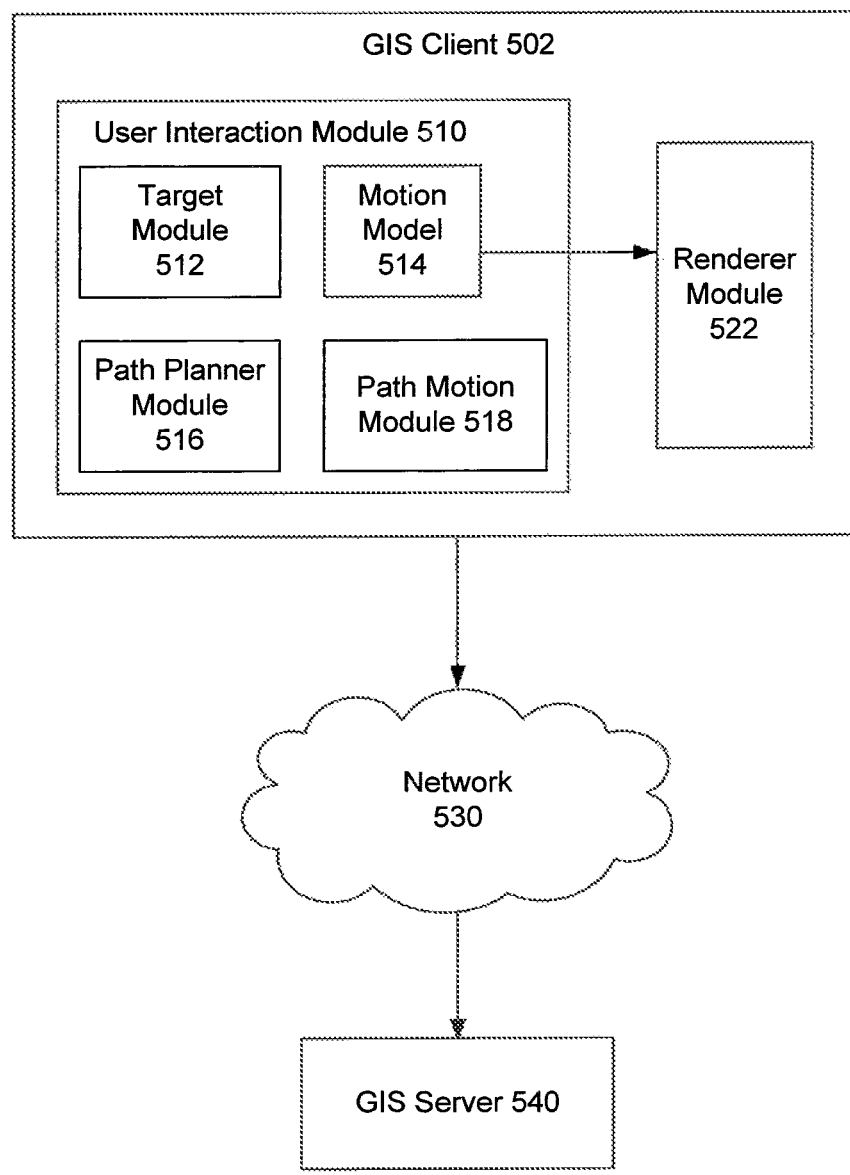
FIG. 5 is a diagram illustrating a system for navigating a virtual camera along a street network toward the target, according to an embodiment.

FIG. 5 is a diagram illustrating a GIS 500 for editing a series of segments tours according to an embodiment. GIS 500 includes a GIS client 502 coupled to a GIS server 540 across one or more network(s) 530, such as the Internet.

GIS client 502 includes a user interaction module 510 and a renderer module 522. User interaction module 510 includes a motion model 514, a target module 512, a path planner module 516, and a path motion module 518.

Target module 512 determines a target location in the three-dimensional environment. In one embodiment, target module 512 accepts an input from a user that specifies a target location, such as an address or coordinates. In another embodiment, target module 512 may receive position data representing a position on a viewport selected by a user, extend a ray based on the position selected by the user, and determine the target location to be an intersection of the ray with an object in the three-dimensional model. As an example, target module 512 may operate as described with respect to FIG. 3.

Path planner module 516 determines a path along a representation of a street in the three-dimensional environment. The path may span from a first position corresponding to an initial location of the virtual camera to a second position corresponding to the target location. Path planner module 516 determines the path to turn at an intersection in a representation of a street network in the three-dimensional environment. At the turn, path planner module 516 may interpolate a spline at the turn in the path to smooth motion of the virtual camera. In an example, the path may comprise a series of discontinuous points as described with respect to FIGS. 4A-B.

Path motion module 518 moves a virtual camera in the three-dimensional environment toward the target location along the path and orients the virtual camera to face the target location as the virtual camera moves along the path. Path motion module 518 may use the path to prefetch geographic information from GIS server 540.

Motion model 514 constructs a view specification. The view specification defines the virtual camera's viewable volume within a three dimensional space, known as a frustum, and the position and orientation of the frustum in the geographic data. In an embodiment, the frustum is in the shape of a truncated pyramid. The frustum has minimum and maximum view distances that can change depending on the viewing circumstances. Thus, changing the view specification changes the geographic data culled to the virtual camera's viewable volume. The culled geographic data is drawn by renderer module 522.

The view specification may specify three main parameter sets for the virtual camera: the camera tripod, the camera lens, and the camera focus capability. The camera tripod parameter set specifies the following: the virtual camera position (X, Y, Z coordinates); which way the virtual camera is oriented relative to a default orientation, such as heading angle (e.g., north, south, in-between); pitch (e.g., level, down, up, in-between); and yaw/roll (e.g., level, clockwise, anti-clockwise, in-between). The lens parameter set specifies the following: horizontal field of view (e.g., telephoto?, normal human eye—about 55 degrees?, or wide-angle?); and vertical field of view (e.g., telephoto?, normal human eye—about 55 degrees?, or wide-angle?). The focus parameter set specifies the following: distance to the near-clip plane (e.g., how close to the "lens" can the virtual camera see, where objects closer are not drawn); and distance to the far-clip plane (e.g., how far from the lens can the virtual camera see, where objects further are not drawn).

Each of GIS client 502 and GIS server 540 may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Each of user interaction module 510, renderer module 522, motion model 514, target module 512, path planner module 516, and path motion module 518 may be implemented in hardware, software, firmware, or any combination thereof.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for street-level navigation of a virtual camera in a three-dimensional environment, the virtual camera defining a perspective to display the three-dimensional environment, comprising:
   (a) determining, by one or more computing devices, a target location in the three-dimensional environment, the three-dimensional environment including a plurality of points, each point corresponding to a location where a panoramic photograph was taken;
   (b) determining, by one or more computing devices, a path specified by a discontinuous series of two or more of the plurality of points in the three-dimensional environment such that the path runs from a first position corresponding to an initial location of the virtual camera to a second position corresponding to the target location, and wherein at least a portion of the path is determined to run along a representation of a street;
   (c) moving, by one or more computing devices, the virtual camera in the three-dimensional environment toward the target location along the path determined in (b) such that the virtual camera is moved to each point in the series of points in an order specified by the series, wherein the three-dimensional environment includes a plurality of building models, at least one building model in the plurality of building models is positioned between the initial location of the virtual camera and the target location, and the virtual camera avoids colliding with the at least one building model by moving along the path specified the series of points; and
   (d) orienting, by one or more computing devices, the virtual camera to face the target location as the virtual camera moves along the path.

2. The method of claim 1, wherein determining (b) comprises:
   (i) determining the path to turn at an intersection in a representation of a street network in the three-dimensional environment, and
   (ii) interpolating a spline at the turn in the path to smooth motion of the virtual camera at the turn.

3. The method of claim 1, wherein determining (b) comprises determining a first point in the series of points to be a position of the panoramic photograph closest to the initial location of virtual camera that does not specify that the virtual camera move away from the target location.

4. The method of claim 1, wherein determining (b) comprises determining a final point in the series of points to be a position of the panoramic photograph closest to the target location of virtual camera that does not specify that the virtual camera move past the target location.

5. The method of claim 1, wherein determining (b) comprises determining the path not to exceed a maximum length value.

6. The method of claim 1, wherein determining (a) comprises:
   (i) receiving position data representing a position on a viewport selected by a user;
   (ii) extending a ray based on the position selected by the user;
   (iii) determining the target location to be an intersection of the ray with an object in the three-dimensional model.

7. The method of claim 1, further comprising:
   (e) before the virtual camera is moved in (c) such that a view frustum of the virtual camera captures three-dimensional model data along the path, prefetching the three-dimensional model data.

8. A system for street-level navigation of a virtual camera in a three-dimensional environment, the virtual camera defining a perspective to display the three-dimensional environment, comprising:
   a target module, implemented on one or more computing devices, that determines a target location in the three-dimensional environment, the three-dimensional environment including a plurality of points, each point corresponding to a location where a panoramic photograph was taken;
   a path planner module, implemented on one or more computing devices, that determines a path specified by a discontinuous series of two or more of the plurality of points in the three-dimensional environment such that the path runs from a first position corresponding to an initial location of the virtual camera to a second position corresponding to the target location, and wherein at least a portion of the path is determined to run along a representation of a street; and
   a path motion module, implemented on one or more computing devices, that, after the path planner module determines the path, moves the virtual camera in the three-dimensional environment toward the target location along the path and orients the virtual camera to face the target location as the virtual camera moves along the path such that the virtual camera is moved to each point in the series of points in an order specified by the series, wherein the three-dimensional environment includes a plurality of building models, at least one building model in the plurality of building models is positioned between the initial location of the virtual camera and the target location, and the virtual camera avoids colliding with the at least one building model by moving along the path specified by the series of points.

9. The system of claim 8, wherein the path planner module determines the path to turn at an intersection in a representation of a street network in the three-dimensional environment and interpolates a spline at the turn in the path to smooth motion of the virtual camera at the turn.

10. The system of claim 8, wherein the path planner module determines a first point in the series of points to be a position of the panoramic photograph closest to the initial location of virtual camera that does not specify that the virtual camera move away from the target location.

11. The system of claim 8, wherein the path planner module determines a final point in the series of points to be the position of the panoramic photograph closest to the target location of virtual camera that does not specify that the virtual camera move past the target location.

12. The system of claim 8, wherein the path planner module determines the path not to exceed a maximum length value.

13. The system of claim 8, wherein the target module receives position data representing a position on a viewport selected by a user, extends a ray based on the position selected by the user, and determines the target location to be an intersection of the ray with an object in the three-dimensional model.

14. The system of claim 8, wherein the path motion module, before the virtual camera is moved such that a view frustum of the virtual camera captures three-dimensional model data along the path, prefetches the three-dimensional model data.

15. The system of claim 8, further comprising:
at least one computing device that implements the target module, the path planner module, and the path motion module.

16. A computer-implemented method for street-level navigation of a virtual camera in a three-dimensional environment, the virtual camera defining a perspective to display the three-dimensional environment, comprising:
(a) determining, by one or more computing devices, a target location in the three-dimensional environment, the three-dimensional environment including a plurality of points, each point corresponding to a location where a panoramic photograph was taken;
(b) determining, by one or more computing devices, a path specified by a discontinuous series of two or more of the plurality of points in the three-dimensional environment such that the path runs from a first position corresponding to an initial location of the virtual camera to a second position corresponding to the target location, and wherein at least a portion of the path is determined to run along a representation of a real-world pathway;
(c) moving, by one or more computing devices, the virtual camera in the three-dimensional environment toward the target location along the path determined in (b) such that the virtual camera is moved to each point in the series of points in an order specified by the series, wherein the three-dimensional environment includes a plurality of building models, at least one building model in the plurality of building models is positioned between the initial location of the virtual camera and the target location, and the virtual camera avoids colliding with the at least one building model by moving along the path specified by the series of points; and
(d) orienting, by one or more computing devices, the virtual camera to face the target location as the virtual camera moves along the path.

* * * * *